INVENTOR.
ALEXANDER A. PARENTE
BY Louis Necho
ATTORNEY.

United States Patent Office 3,443,733
Patented May 13, 1969

3,443,733
SOLDERING AND DESOLDERING TOOL
Alexander A. Parente, 327 Calvert Road,
Merion Station, Pa. 19066
Filed Jan. 11, 1967, Ser. No. 608,659
Int. Cl. B23k 3/04
U.S. Cl. 228—20                    1 Claim

ABSTRACT OF THE DISCLOSURE

An electric iron for soldering and desoldering, especially designed for delicate work where the application of high heat is critical.

BACKGROUND OF THE INVENTION

The field of the invention

In soldering, or desoldering, thin wires, and the like, it is necessary that the heat applied be enough to melt the solder but not enough to damage the parts being joined or separated.

THE PRIOR ART

The prior art, as exemplified by Patent No. 2,609,778, teaches the broad idea of providing means for blowing cooling air on the parts heated during the soldering, or desoldering, operation.

THE INVENTION

Resides in improved means for blowing ambient air on the parts being soldered to protect against damage due to residual heat, to minimize the time needed for the solder to harden, and for blowing air to remove the solder melted during a desoldering operation.

DESCRIPTION OF THE PREFERRED EMBODIMENTS

Figure 1:
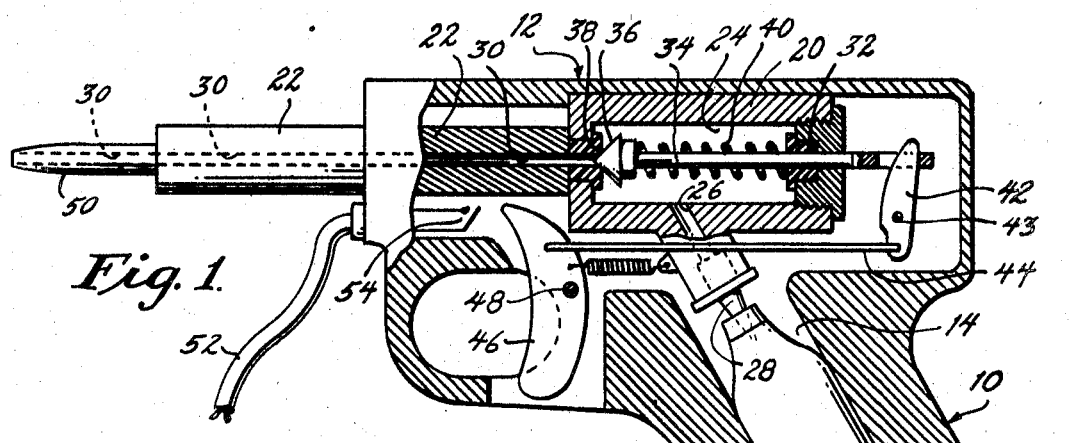
FIG. 1 is a view, partly in vertical, longitudinal section and partly in side elevation, showing one embodiment of the invention, with the gun shown in closed, or non-blowing, position.

Embodiment of FIG. 1

The gun shown in FIG. 1 includes a handle, or stock 10 and a barrel 12 which are angularly related approximately as shown in FIG. 1. Handle 10 is hollowed out to provide a compartment 14 for receiving a high pressure gas cylinder 16. Access to compartment 14 is had through an opening which is normally closed by a threaded plug 18.

Barrel 12 is also hollowed out to accommodate casing 20, and nozzle 22 which is disposed partly within, and partly without, the barrel. Casing 20 defines a plenum 24 which communicates, through passage 26 and piercing valve 28, with the interior of gas cylinder 16. The operation of piercing valve 28 is conventional and, therefore, is not described.

One end of plenum 24 communicates with a bore 30 which extends through nozzle 22, and the other end thereof is closed by packing 32 through which passes valve rod 34. One end of valve rod 34 carries valve head 36 which is biased against valve seat 38 by spring 40 and controls the flow of gas from plenum 24 into bore 30. The other end of valve rod 34 extends beyond packing 32 and is engaged by finger 42 which is pivoted at 43 and is connected to one end of actuating link 44, the other end of which is connected to a trigger 46 which is pivoted at 48. Nozzle 22 carries a heat sink tip 50 which has an extension of bore 30. Tip 50 is adapted to be energized by wire 52, when normally open switch 54 is closed.

The operation of the embodiment of FIG. 1

For soldering, switch 54 is closed to energize tip 50 and, when the solder is sufficiently melted, the tip is pulled back slightly, while trigger 46 is squeezed to unseat valve head 36 to release a blast, or a stream, of gas against the parts being joined. This "freezes" the solder and prevents damage by residual heat.

For unsoldering, the heated tip is kept in contact with the melted solder so that the blast of gas released by operation of the trigger will blow the melted solder away to prevent it from readhering, which it will, as soon as the heated tip is withdrawn. Plug 18 forms a support which retains tank 16 in position.

Figure 2:
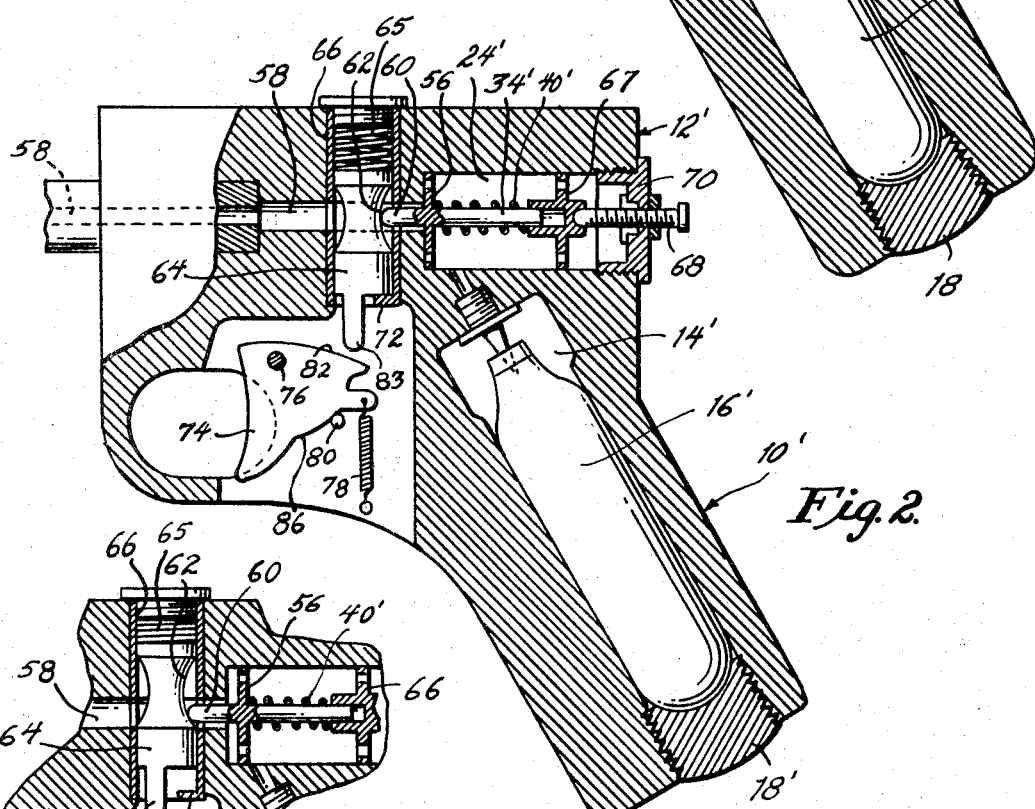
FIG. 2 is similar to FIG. 1 but showing a slight modification of the embodiment shown in FIG. 1.

The embodiment of FIG. 2

Figure 3:
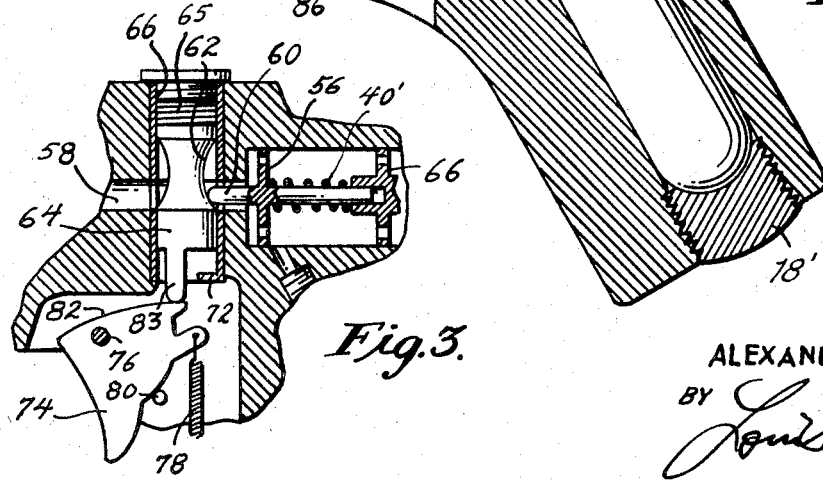
FIG. 3 is a fragmentary view similar to FIG. 2 but showing the gun in open, or air-blowing, position.

In the embodiment of FIGS 2 and 3, valve 36, and valve seat 38 are omitted and valve rod 34', which corresponds to valve rod 34, is provided with a valve disc 56 which is adapted to close the end of a bore 58 which corresponds to bore 30 and leads from plenum 24, to the tip. One end 60 of the valve rod 34' projects beyond disc 56 to form an inner extension which is always within the bore 58 and always bears against cam surface 62 which is formed on a plug 64 which is movable vertically in bearing sleeve 66. To prevent binding, valve rod is provided with a bearing 67 which is slidable against the wall of the plenum and is adjustable in the direction of the axis of the rod by screw 68 which passes through suitable packing 70.

Plug 64 is normally biased downwardly by spring 65, until it comes to rest on stop 72. In this position, the end 60 of valve rod 34' bears against the low surface of cam 62, and disc 56 closes the adjacent end of bore 58. Below plug 64 is a trigger 74 which is pivoted at 76 and is normally biased in clockwise direction by spring 78 until it abuts stop 80. Trigger 74 is provided with an upper cam surface 82 which is engageable with the stem 82 of plug 64 and with a lower cam surface 86 which rides on stop 80.

The operation of the embodiment of FIG. 2

When at rest, the parts assume the position shown in FIG. 2. Counter-clockwise rotation of trigger 74 to the position of FIG. 3 causes upper cam surface 82 of the trigger to bear against the stem 83 of plug 64, to raise the latter to the position of FIG. 3 in which the end 60 of the valve rod rides against a high portion of cam surface 62, and moves valve disc 56 to the open position of FIG. 3 against the action of spring 40.

Only those parts of the embodiment of FIG. 2 which are not present in the embodiment of FIG. 1 have been described and given reference numerals. The parts of the embodiment of FIG. 1 which are present in the embodiment of FIG. 2 or which need no description, have not been described, nor given reference numerals.

What I claim is:

1. A soldering and desoldering gun including:
   a handle and a barrel,
   means in said barrel defining a plenum,
   a compartment formed in said handle, with its inner end adjacent said plenum and with its outer end open for insertion of a gas container having a penetrable and self-sealing closure,
   there being a passage formed in the wall of said plenum with the inner end of said passage leading to said plenum and its outer end leading to the inner end of said compartment, a hollow nipple with one end thereof in the outer end of said passage and with the other end thereof protruding into the inner end of said compartnemt so as to penetrate and seal the closure of a gas container forced thereagainst for establishing constant fluid flow between said container and said plenum, a heat sink tip carried by said barrel and having a through bore therein leading from said plenum to the atmosphere, valve means in said plenum normally preventing flow of gas from said plenum to said bore, a trigger mechanism for unseating said valve, at will, to permit controlled flow of gas from said plenum to the atmosphere through said tip, and a plug for closing the outer end of said compartment and for pushing a container in said compartment against said nipple.

References Cited

UNITED STATES PATENTS

| 2,960,591 | 11/1960 | Brilliuger | 228—20 |
| 3,024,343 | 3/1962 | Siwakoski | 228—20 |

FOREIGN PATENTS

| 875,398 | 8/1961 | Great Britain. |

RICHARD H. EANES, JR., *Primary Examiner*.